(12) United States Patent
Hansen

(10) Patent No.: US 8,147,740 B2
(45) Date of Patent: Apr. 3, 2012

(54) METHOD OF PRODUCING FOOTWEAR

(75) Inventor: Hans Christian Hansen, Løgum Kloster (DK)

(73) Assignee: Ecco Sko A/S, Bredebro (DK)

( * ) Notice: Subject to any disclaimer, the term of this patent is extended or adjusted under 35 U.S.C. 154(b) by 467 days.

(21) Appl. No.: 12/312,081

(22) PCT Filed: Oct. 24, 2007

(86) PCT No.: PCT/DK2007/000454
§ 371 (c)(1),
(2), (4) Date: Apr. 23, 2009

(87) PCT Pub. No.: WO2008/049430
PCT Pub. Date: May 2, 2008

(65) Prior Publication Data
US 2010/0064548 A1    Mar. 18, 2010

(30) Foreign Application Priority Data

Oct. 24, 2006 (DK) .............................. 2006 01381

(51) Int. Cl.
*B29D 35/06* (2010.01)
(52) U.S. Cl. ......... 264/244; 264/261; 264/263; 264/266
(58) Field of Classification Search .................. 264/244, 264/261, 263, 266; 425/119, 129.2
See application file for complete search history.

(56) References Cited

U.S. PATENT DOCUMENTS

| | | | | |
|---|---|---|---|---|
| 4,024,594 A | * | 5/1977 | Haizinger | 12/4.2 |
| 4,886,238 A | * | 12/1989 | Davis | 249/83 |
| 6,205,683 B1 | * | 3/2001 | Clark et al. | 36/30 R |
| 2004/0032042 A1 | * | 2/2004 | Chi | 264/46.4 |
| 2004/0143995 A1 | | 7/2004 | McClelland | |
| 2005/0116383 A1 | * | 6/2005 | Sommerlund et al. | 264/244 |

FOREIGN PATENT DOCUMENTS

| | | |
|---|---|---|
| DE | 20206992 | 8/2002 |
| EP | 0787577 | 8/1997 |
| WO | WO0057740 | 10/2000 |

* cited by examiner

*Primary Examiner* — Jill Heitbrink
(74) *Attorney, Agent, or Firm* — Cooper & Dunham LLP

(57) ABSTRACT

The present invention relates to a method of producing footwear. The footwear has an upper and an outsole with an upraised portion, such as a toe bumper or a heel bumper. The method uses a mould comprising a last, upon which the upper is arranged, an upper mould part divided into two side parts being laterally movable in relation to a lower mould part between a first and second position, and the lower mould part being vertically movable in relation to the upper mould part between a third and fourth position. The method comprises the following steps: —placing the outsole 3 in a lower mould part 4 of a mould, —placing an upper 2 in a cavity of the mould, —moving at least one side part 5 against the other side part 5 from a first to a second position whereby the two side parts abut the upper 2, —injecting a composition into the space 12 in order to connect the outsole to the upper and to make a midsole 9, and moving the lower mould part 4 towards the upper 2 from a third to a fourth position so that a tip 8 of the upraised portion 7 is pressed towards the upper 2 by a control surface 13 of the side parts 5 so that a space is maintained between the upper and upraised portion 7 of the outsole 3.

16 Claims, 5 Drawing Sheets

METHOD OF PRODUCING FOOTWEAR

TECHNICAL FIELD

The present invention relates to a method of producing footwear having an upper and an outsole with an upraised portion by use of a mould comprising a last, upon which the upper is arranged, an upper mould part being divided into two side parts that are laterally movable in relation to a lower mould part between a first and second position, and the lower mould part being vertically movable in relation to the upper mould part between a third and fourth position.

BACKGROUND ART

When making footwear, such as a shoe or a boot, manufacturers have made many attempts to make a manufacturing process having no manual processes. Especially, focus has been directed towards the manual process of using an adhesive for fastening the sole of the shoe to the upper of the shoe due to the chemicals released from the adhesive during the hardening of the adhesive connection between the sole and the upper.

In order to reduce the manual adhesive processes, a midsole is made as an injected composition between the outsole of the shoe and the upper of the shoe. However, it has not been possible to find a way of fastening an upraised portion of the sole, such as a toe bumper or a heel bumper, without using the manual adhesive process.

Furthermore, there is a risk of damaging the shoe in the manual adhesive process, in that a small mistake may result in the dropping of the adhesive on the part of the upper making the final appearance of the shoe. Attempts to remove the drop of adhesive usually results in a stain resulting in the fact that the shoe is discarded.

SUMMARY OF INVENTION

An object of the present invention is, at least partly, to overcome the disadvantages of the prior art and to provide an improved method of manufacturing footwear and thereby improved footwear, an improved working environment during the manufacturing process, and an improved manufacturing time of the footwear.

This object and the advantages becoming evident from the description below are obtained by a method of producing footwear having an upper and an outsole with an upraised portion by use of a mould comprising a last, upon which the upper is arranged, an upper mould part being divided into two side parts that are laterally movable in relation to a lower mould part between a first and second position, and the lower mould part being vertically movable in relation to the upper mould part between a third and fourth position, comprising the following steps:
  placing the outsole in a lower mould part of a mould,
  placing an upper in a cavity of the mould,
  moving at least one side part against the other side part from a first to a second position whereby the two side parts abut the upper,
  injecting a composition into the space for connecting the outsole to the upper and for making a midsole, and
  moving the lower mould part towards the upper from a third to a fourth position so that a tip of the upraised portion is pressed towards the upper by a control surface of the side parts so that a space is maintained between the upper and the upraised portion of the outsole.

When the side parts of the mould abut the upper of the footwear and, subsequently, the bottom mould part holding the outsole moves upwards towards the upper and the side parts, the tip of the upraised portion is somewhat tilted so that the side parts press the tip towards the upper. In this way, the lower mould part presses the outsole and the upraised portion of the outsole towards the side parts. The side parts project beyond the lower mould part and lead the tip of the upraised portion towards the upper.

In the area of the upraised portion, the upraised portion constitutes an upper limit for how far the injected composition may spread. In the rest of the circumference of the upper, the side parts press directly towards the upper and constitute the upper limit for the spreading of the injected composition.

Due to the fact that the mould parts are so constructed as to leave a space between the outsole and the upper in the fourth and closed position of the mould, the injected composition may spread out to constitute both a fastening of the upraised portion and a midsole. The upper mould parts are designed to project beyond the lower mould part in order to ensure that the upraised portion is led into place, and to abut the upper.

By moving the lower mould part towards the upper from a third to a fourth position so that a tip of the upraised portion is pressed towards the upper by a control surface of each side part in order to maintain a space between the upper and upraised portion of the outsole, the injected composition is able to spread underneath the upraised portion and fasten the upraised portion in the same process as the process of making a flexible midsole between the outsole and the upper.

In the prior art of shoe production, an upraised portion such as a toe bumper is fastened by means of some adhesive in a process subsequent to the injection moulding process. By fastening the upraised portion in the injection moulding process, an adhesive process is skipped and the working environment is improved since the manual process of adhering the upraised portion is performed by a machine in the present solution.

In an embodiment of the present invention, the injecting step may be performed by injecting the composition into the space from a heel portion of the midsole.

In another embodiment of the present invention, the upraised portion may be a toe bumper, a heel bumper, a medial bumper, a lateral bumper, or an arch support.

Furthermore, according to the invention, the composition may be injected into an opposite end of the midsole from where the upraised portion is situated.

Additionally, the composition may, according to another embodiment, be injected into the space from one position in the mould into two different positions in the space.

In yet another embodiment, the side parts may project beyond the lower mould part and press towards the upper and the upraised portion so that the upraised portion and the side part constitute an upper limit for how far the injected composition may spread.

According to the invention, the composition may be ethylene vinyl acetate (EVA), natural or synthetic rubber, polyurethane (PU), or thermoplastic polyurethane (TPU).

Furthermore, the outsole may, according to the invention, be made in a first step by injection moulding into the lower mould part and a different upper mould part in a first step, or by punching.

Additionally, according to the invention, the outsole may be made of a wear resistant material, such as natural or synthetic rubber, polyurethane (PU), thermoplastic polyurethane (TPU), thermoplastic elastomer (TPE), latex, or leather.

Furthermore, the invention relates to footwear having an upper, an outsole with an upraised portion extending onto the upper, and a midsole between the upper and the outsole, said outsole, including the upraised portion thereof, being fastened to the upper by injection moulding of the midsole, a portion of the midsole extending between the outsole and the upper.

Finally, the midsole of the footwear may be made from thermoplastic polyurethane.

BRIEF DESCRIPTION OF THE DRAWINGS

The invention is explained in detail below with reference to the drawings, in which.

DETAILED DESCRIPTION OF THE PREFERRED EMBODIMENTS

Figure 1:
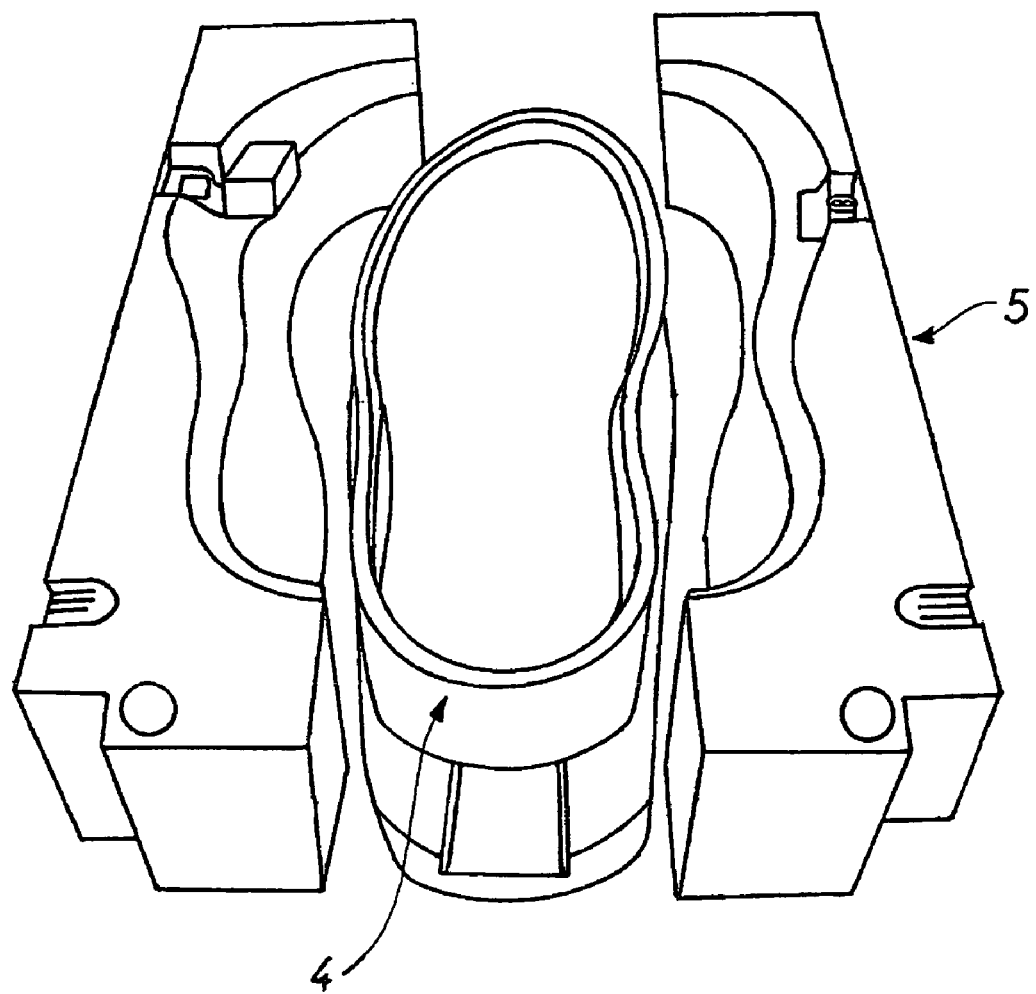
FIG. 1 shows a mould with two side parts and a bottom part.

Footwear 1 comprises an upper 2 made of leather, cloth, or the like material, and an outsole 3 of a wear resistant material. The upper 2 of the shoe 1 is usually manufactured in a sewing process and, subsequently, the outsole 3 is adhered onto the upper 2. In the present invention, the outsole 3 is adhered onto the upper 2 by injection moulding, i.e. by injecting a composition in a space between the upper 2 and the outsole 3. The composition spreads out in the space all the way to the tip 8 of the sole and thus adheres the entire sole 3 to the upper 2 including an upraised portion 7, such as a toe bumper, heel bumper, or an arch support. When the space has been filled with the composition, the composition constitutes a flexible midsole 9.

As mentioned, the upper of the footwear 1, such as a shoe or a boot, is made in a previous process before the sole of the footwear is adhered to the upper in making the final shoe or boot. When the upper 2 has been made in e.g. a sewing process, the upper is placed on a last 6 of hard material so that parts 5 of the mould may press against the last 6 during the moulding process without breaking the last 6.

The process of injection moulding is performed by means of a mould as shown in FIG. 1. The mould has an upper mould part 5 which is divided into two side parts 5 being laterally movable in relation to a lower mould part 4 between a first and second position. The mould further comprises a lower mould part 4 being vertically movable in relation to the upper mould part 5 between a third and fourth position.

According to the method of the present invention, an outsole is firstly placed in a lower mould part 4 of a mould as shown in FIG. 1. Secondly, an upper provided on a last is placed in its initial position in the first position of the mould, where the upper is placed in a cavity of the mould before any parts of the mould is moved into position, before performing an injection moulding process.

Figure 2A:
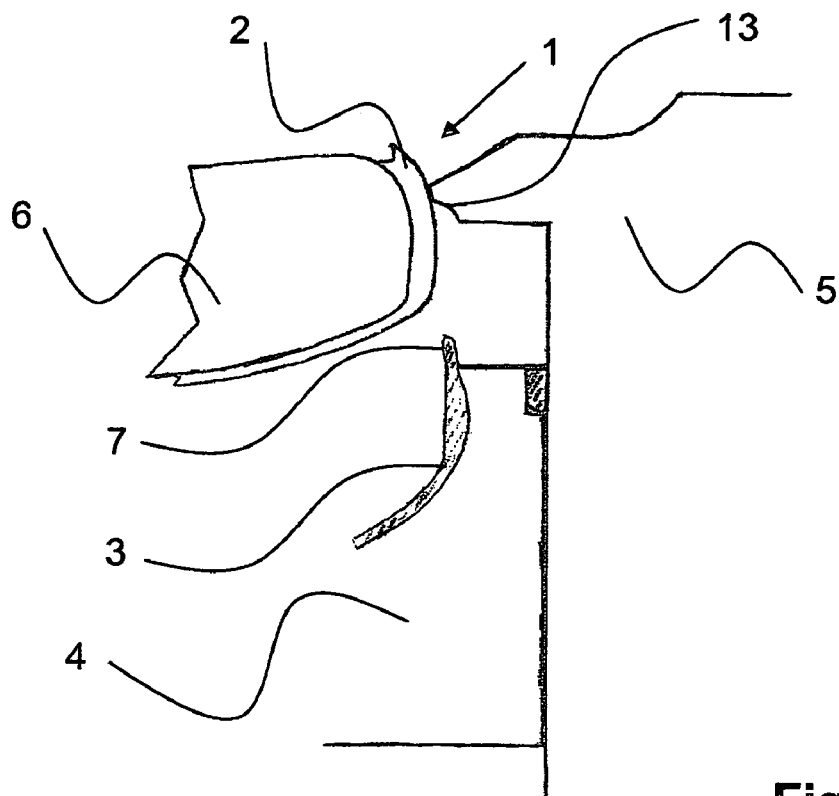
FIG. 2a shows an upper being placed in a cavity of a mould in its initial position.
Figure 2B:
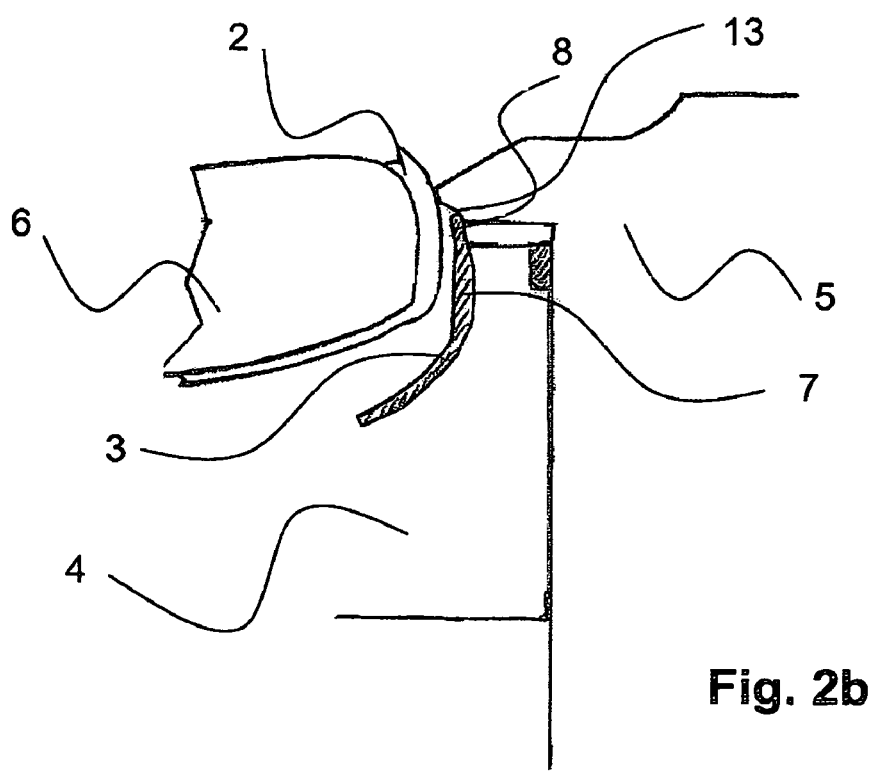
FIG. 2b shows a lower mould part of the mould moved in relation to FIG. 2a, FIG. 2c shows the lower mould part in its final position.
Figure 2C:
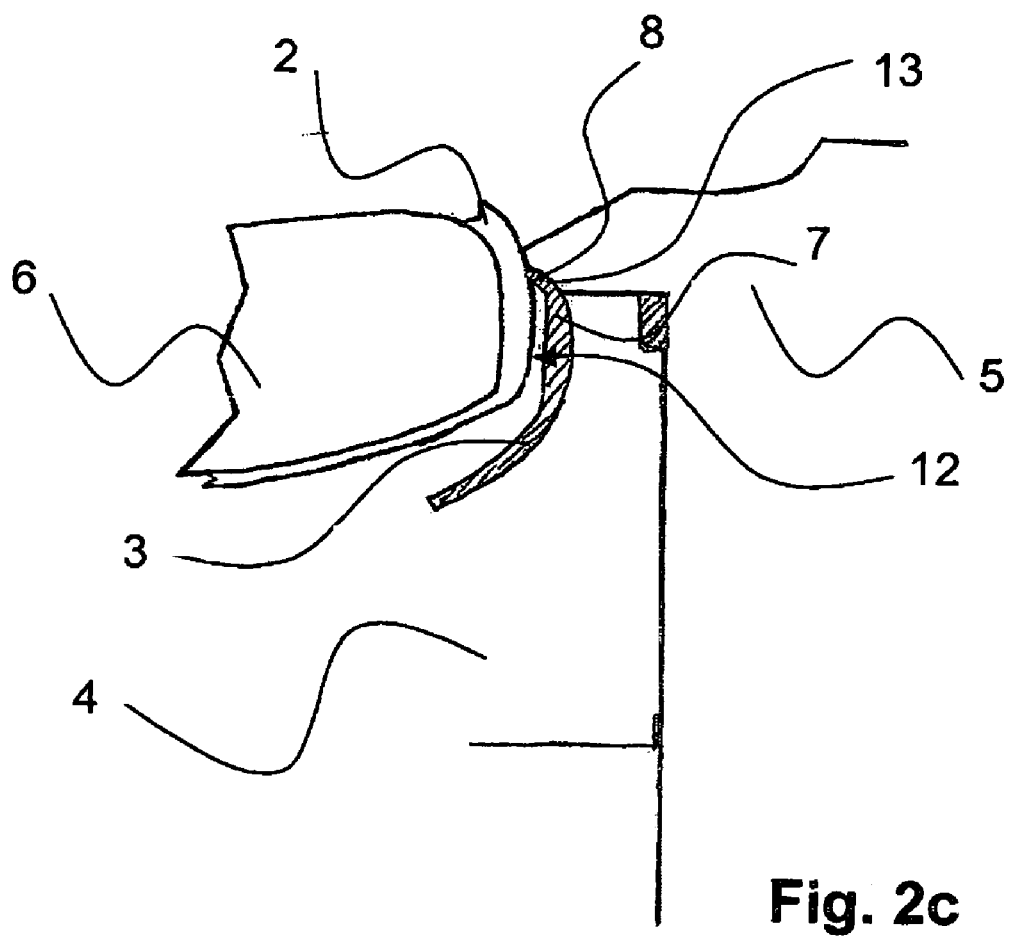
Figure 3:
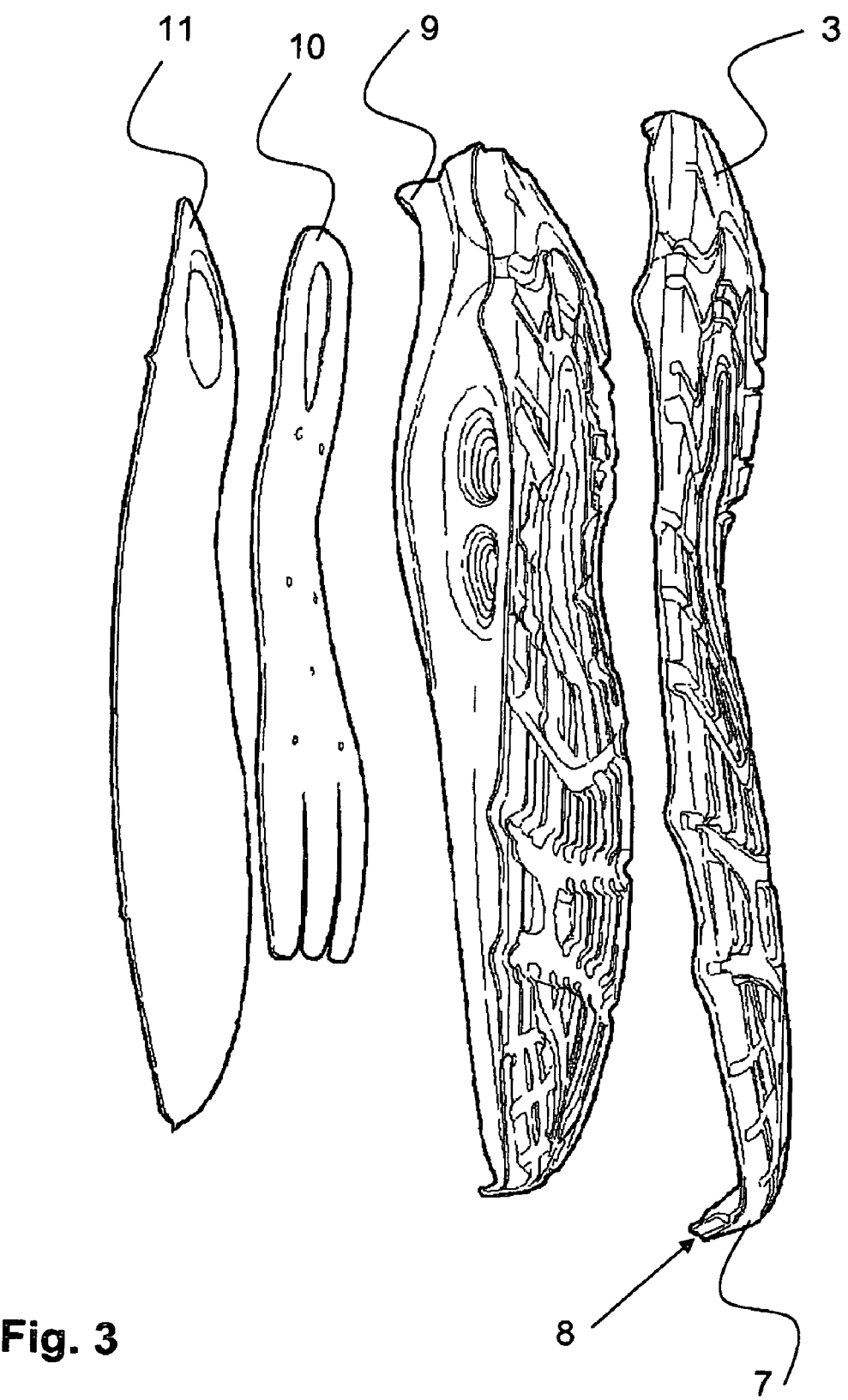
FIG. 3 shows an exploded view of a sole of a shoe.
Figure 4:
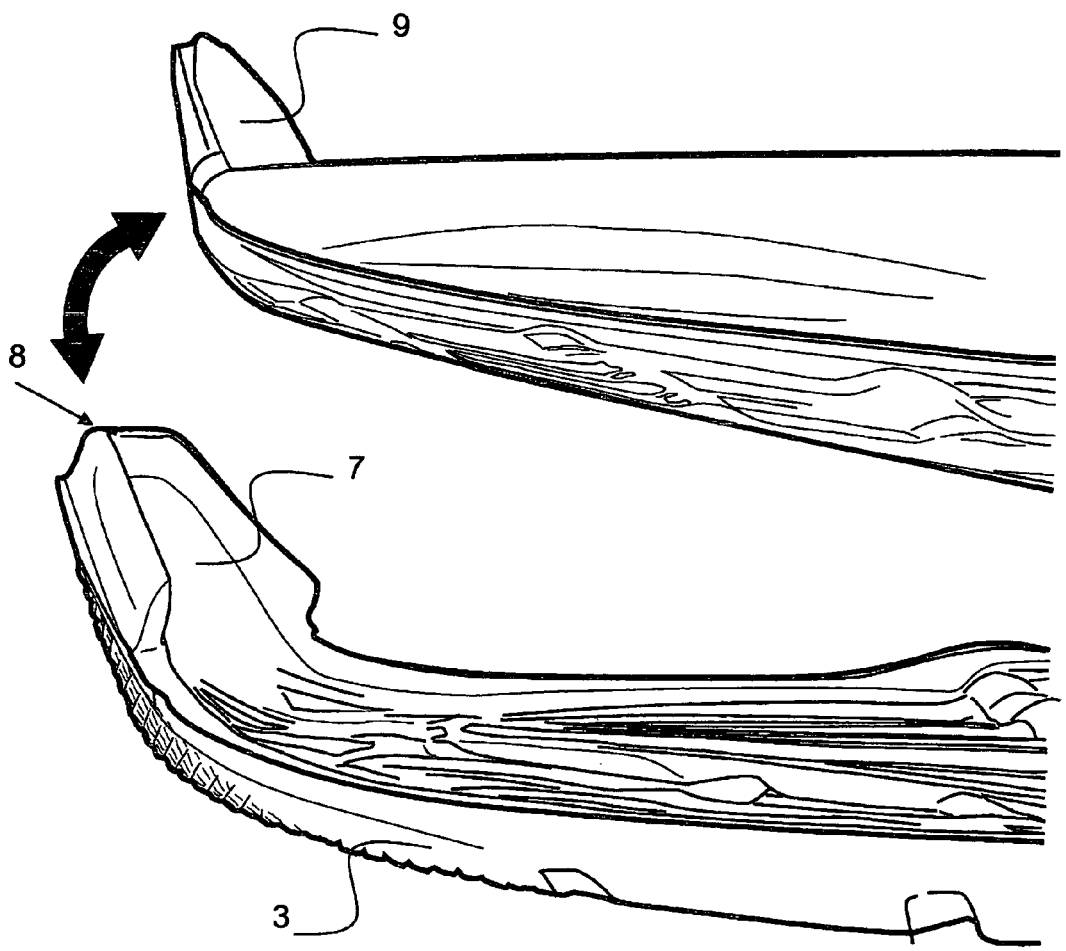
FIG. 4 shows an exploded view of part of a midsole and an outsole.

In the embodiment shown in FIGS. 2a-2c, the mould has two side parts 5 movable against one another and the lower mould part 4. FIG. 2a shows the mould in a second position, wherein the two side parts of the mould have been moved towards each other, resulting in the pressing of the side parts towards the circumference of the upper of the shoe placed on the last. When the two side parts have been moved to press towards the upper, the step of injecting the composition begins. In this way, the composition is injected into a space between the upper and the outsole. In FIG. 2b, a further step of the method is shown wherein the lower mould part is moving upwards to the shoe and the side parts. In FIG. 2c, the mould is shown in its fourth position where the moving of the lower mould part has taken place so that the lower mould part 4 abuts part of the two side parts 5 of the mould. In this way, a tip of the upraised portion 7 of the outsole 3 is pressed towards the upper by the side parts. Most of the outsole is still kept in a distance from the upper in that the lower mould part of the mould does not abut the upper. Hereby the space between the upper and the outsole is partly maintained. This maintained space is filled since the injected composition spreads out to fill up the whole space. The composition is a flexible polymer, preferably an expandable polymer, which fastens the outsole to the upper while providing a flexible midsole 9.

In the step where the lower mould part is moved up to abut part of the side parts, the tip of the upraised part 7 is somewhat tilted so that the space 12 between the upper and the outsole 3 is closed upwards. In this way, the injected composition, such as a flexible polymer, is prevented from spreading to the outside of the upraised part of the outsole, thus maintaining the flexible polymer within the space 12 even during an expansion of the flexible polymer. In the fourth position of the mould, the two side parts 5, the bottom of the upper 2, and the outsole 3 positioned in the lower mould part 4 form the space 12 between the upper 2 and the outsole 3.

The outsole of footwear is that part of the final shoe or boot being subjected to wear when the foot is pressing the shoe down on the ground during walking, running, climbing, or similar movements. The outsole is typically made of wear resistant material, such as synthetic or natural rubber or any suitable polymer, such as thermoplastic polyurethane. The production of the outsole is made in a moulding process prior to the present method, but in another embodiment of the present invention, the moulding process may be a production step comprised in the present method, e.g. by using multi-stage injection moulding. In this way, a further handling step of the footwear in the production line is skipped.

In the present embodiment, the upraised portion is a toe bumper. In this case, the injection of the composition is performed from the heel portion of the sole. In another embodiment the upraised portion is a heel bumper, an arch support, or the like. The injection of the composition is in the same manner injected from a position of the sole opposite this upraised portion. In case of an arch support, the injection may be performed by injecting the composition into both the heel portion and the toe portion of the sole in order to ensure that the composition is able to spread out to the most distant ends of the space. The composition may be injected from the same position, but into two different positions in the space in order for the composition to reach the most distant ends of the space.

By injecting composition into the space 12, other parts of the sole of the shoe, such as an insole 10 and/or a footbed 11, may be fastened by the injected composition.

The invention claimed is:

1. A method of producing footwear having an upper and an outsole with an upraised portion by use of a mould comprising a last, upon which the upper is arranged, an upper mould part being divided into two side parts that are laterally movable in relation to a lower mould part between a first and second position, and the lower mould .part being vertically movable in relation to the upper mould part between a third and fourth position, said method comprising:

placing the outsole in a lower mould part of a mould, placing an upper in a cavity of the mould, moving at least one side part against the other side part from a first to a second position whereby the two side parts abut the upper, injecting a composition into a space between the upper and the outsole for connecting the outsole to the upper and for making a midsole, and moving the lower mould part towards the upper from a third to a fourth position so that a tip of the upraised portion is pressed towards the upper by a control surface of the side parts so that some of the space is maintained between the upper and upraised portion of the outsole.

2. A method according to claim 1, wherein the injecting step is performed by injecting the composition into the space from a heel portion of the midsole.

3. A method according to claim 1, wherein the upraised portion comprises a toe bumper, a heel bumper, a medial bumper, a lateral bumper or an arch support.

4. A method according to claim 1, wherein the composition is injected into an opposite end of the midsole from where the upraised portion is situated.

5. A method according to claim 1, wherein the composition is injected into the space from one position in the mould into two different positions in the space.

6. A method according to claim 1, wherein the side parts project beyond the lower mould part in order to constitute a control surface pressing towards the upper and the upraised portion so that the upraised portion and the side part constitute an upper limit for how far the injected composition may spread.

7. A method according to claim 1, wherein the composition is ethylene vinyl acetate (EVA), natural or synthetic rubber, polyurethane (PU), or thermoplastic polyurethane (TPU).

8. A method according to claim 1, wherein the outsole is made in a first step by injection moulding into the lower mould part and a different upper mould part in a first step, or by punching.

9. A method according to claim 1, wherein the outsole is made of a wear resistant material, such as natural or synthetic rubber, polyurethane (PU), thermoplastic polyurethane (TPU), thermoplastic elastomer (TPE), latex, or leather.

10. A method according to claim 2, wherein the upraised portion comprises a toe bumper, a heel bumper, a medial bumper, a lateral bumper or an arch support.

11. A method according to claim 2, wherein the composition is ethylene vinyl acetate (EVA), natural or synthetic rubber, polyurethane (PU), or thermoplastic polyurethane (TPU).

12. A method according to claim 3, wherein the composition is ethylene vinyl acetate (EVA), natural or synthetic rubber, polyurethane (PU), or thermoplastic polyurethane (TPU).

13. A method according to claim 4, wherein the composition is ethylene vinyl acetate (EVA), natural or synthetic rubber, polyurethane (PU), or thermoplastic polyurethane (TPU).

14. A method according to claim 5, wherein the composition is ethylene vinyl acetate (EVA), natural or synthetic rubber, polyurethane (PU), or thermoplastic polyurethane (TPU).

15. A method according to claim 6, wherein the composition is ethylene vinyl acetate (EVA), natural or synthetic rubber, polyurethane (PU), or thermoplastic polyurethane (TPU).

16. A method of producing footwear having an upper and an outsole with an upraised portion, said method comprising:

placing the outsole in a lower mould part of a mould;

placing an upper in a cavity of the mould;

moving at least one side part against another side part from a first to a second position whereby the two side parts abut the upper;

injecting a composition into a space between the upper and the outsole for connecting the outsole to the upper and for making a midsole; and moving the lower mould part towards the upper from a third to a fourth position so that a tip of the upraised portion is pressed towards the upper by a control surface of the side parts so that some of the space is maintained between the upper and upraised portion of the outsole.

* * * * *